United States Patent [19]

Igaku

[11] Patent Number: 5,074,832
[45] Date of Patent: Dec. 24, 1991

[54] TIMING DRIVING UNIT FOR PLANETARY GEAR ASSEMBLY

[75] Inventor: Shoji Igaku, Nara, Japan
[73] Assignee: Matex Co., Ltd., Osaka, Japan
[21] Appl. No.: 531,585
[22] Filed: Jun. 1, 1990
[30] Foreign Application Priority Data Oct. 2, 1989 [JP] Japan ................. 1-258226

[51] Int. Cl.[5] ............... F16H 57/10; F16H 57/08
[52] U.S. Cl. ......................... 475/317; 475/335
[58] Field of Search ............ 74/447; 475/317, 335, 475/154

[56] References Cited

U.S. PATENT DOCUMENTS

| 1,513,181 | 10/1924 | Powell | 475/335 |
|---|---|---|---|
| 2,444,448 | 7/1948 | Kannenberg | 475/320 X |
| 2,564,271 | 8/1951 | Millns | 475/317 |
| 3,943,780 | 3/1976 | Klaue | 475/317 |
| 4,069,726 | 1/1978 | Garconnet | 475/317 |
| 4,090,416 | 5/1978 | Hicks | 475/317 X |
| 4,503,719 | 3/1985 | Hamano | 74/7 E |
| 4,617,839 | 10/1986 | Matoba | 475/335 |
| 4,838,123 | 6/1989 | Matoba | 475/335 |

FOREIGN PATENT DOCUMENTS

| 444697 | 5/1927 | Fed. Rep. of Germany . | |
|---|---|---|---|
| 58-94656 | 6/1983 | Japan . | |
| 60-260738 | 12/1985 | Japan | 475/335 |
| 0361334 | 12/1972 | U.S.S.R. | 475/317 |
| 0647863 | 12/1950 | United Kingdom | 475/317 |
| 1116791 | 6/1968 | United Kingdom . | |
| 2105815 | 3/1983 | United Kingdom . | |
| 2107425 | 4/1983 | United Kingdom . | |

OTHER PUBLICATIONS

Phelan, Richard M., *Fundamentals of Mechanical Design*, McGraw-Hill Book Company, New York, 1970, pp. 422–423.

*Primary Examiner*—Richard Lorence
*Assistant Examiner*—David E. Henn
*Attorney, Agent, or Firm*—Cushman, Darby & Cushman

[57] ABSTRACT

A modified planetary gear assembly includes a sun gear, planetary gears, an internally-toothed ring gear and a carrier, and can either transmit or not transmit torque from the sun gear to the carrier. The internally-toothed ring gear has outer peripheries on both sides suitable for being supported by a bearing device and a middle groove on the outer surface having timing teeth shaped around the groove. The peripheries are supported by a bearing device. A stopper device which is movable in a radial direction is mounted at a point around the middle groove. When the stopper device is moved forward to engage with the timing tooth, the internally-toothed ring gear is fixed and torque is transmitted from the sun gear to the carrier. When the stopper device is retracted, the internally-toothed ring gear freely rotates and no torque is transmitted. Thus, there are two states of torque transmission. The rotation speed of the internally-toothed ring gear is inversely determined by the rotation speed of the sun gear and the carrier.

11 Claims, 3 Drawing Sheets

TIMING DRIVING UNIT FOR PLANETARY GEAR ASSEMBLY

FIELD OF THE INVENTION

This invention relates to a timing driving unit using a planetary gear assembly in which an internal gear can be supported either in a rotatable state or in a rest state. In the rest state, the planetary gear assembly transmits torque, but in the rotatable state it transmits no torque. The transmission or non-transmission of torque can be selected alternatively.

BACKGROUND OF THE INVENTION

A planetary gear consists of a sun gear, planetary gears, a carrier and an internal gear. In general, planetary gear assemblies are used as decelerators or accelerators. They are geometrically advantageous in that an input shaft and an output shaft are arrayed along the same axis. In a planetary gear assembly, transmission torque is exactly divided among three or four planetary gears which are disposed at rotationally-symmetric positions. Therefore, the transmission efficiency is high, because the torque is equally allocated to the equivalent planetary gears.

In the case of use as a decelerator, an input shaft is connected with a sun gear, and an output shaft is connected with a carrier. An internal gear is fixed to a casing.

In this case, the reduction rate R is given by the equation $$R = 1 + \frac{I}{S} \tag{1}$$

where S and I are tooth numbers of the sun gear and the internal gear, respectively.

In most cases like this, planetary gear assemblies are simply used as decelerators with a fixed reduction rate in which the internal gear is fixed.

In a few limited cases, the internal gear is rotatably supported to change the reduction rate continuously. An additional internal gear is shaped on the external surface of the internal gear ring which can rotate along the common central axis. Another adjusting gear (T) meshes with the external gear. In these cases, both sun gear and internal gear supply the input rotation and the carrier gives the output rotation.

The angular velocities of sun gear, internal gear and carrier are denoted by $\Omega s$, $\Omega i$ and $\Omega c$ respectively. The relation among them is described as $$S\Omega s + I\Omega i = (S + I)\Omega c \tag{2}$$

The angular velocity $\Omega c$ of the carrier is no longer in proportion to the angular velocity $\Omega s$ of the sun gear. The angular velocity of the carrier can be adjusted by changing the velocity $\Omega i$ of the internal gear.

The tooth number of the adjusting gear (T) is denoted by T. Its angular velocity is denoted by $\Omega t$. The adjusting gear (T) meshes with the external gear whose tooth number is E. The external gear (E) and the internal gear (I) are shaped on opposing surfaces of the same ring. The restriction in the meshment is expressed by $$E\Omega i = -T\Omega t \tag{3}$$

Substituting Eq. (3) into Eq. (2), we obtain the equation $$S\Omega s - \frac{IT}{E}\Omega t = (S + I)\Omega c \tag{4}$$

This means that the angular velocity $\Omega c$ of the carrier can be changed by the rotation of the adjusting gear (T) even if the angular velocity of the sun gear is kept constant.

In these cases, the internal gear is positively and definitely rotated by the adjusting gear for controlling the rotation of the carrier. The ring on which the internal gear and the external gear are shaped is called an "internally-toothed ring gear." The outer ring must be rotatably supported by a bearing. The supporting surfaces of the bearing are side cylindrical surfaces whose diameters are smaller than that of the pitch circle of the external gear of the outer ring. The external gear is shaped between two side supporting surfaces.

Besides the reduction rate adjustable planetary gear assemblies above-mentioned, some kinds of planetary gear assemblies have internal gears which are rotatably sustained in a casing to alleviate an external shock. In this case, the internally-toothed ring gear is elastically sustained by a casing. For example, the casing can have several inner projections and the internally-toothed ring gear can have several outer projections. The inner projections of the casing mesh with the outer projections of the internally-toothed ring gear with an elastic material such as rubber or plastic disposed in the space between the outer and inner projections. In a normal state, where transmission torque is under a determined value, the internally-toothed ring gear is fixed. When an excess of torque is applied to the output shaft, the internally-toothed ring gear rotates slightly to alleviate the external shock (i.e., excess of torque). These types of gears are described in British Patent Application 2,107,425 and British Patent 1,116,791.

For the purpose of absorbing an excess of torque, the internally-toothed ring gear need not be sustained by a bearing, because the internally-toothed ring gear rotates by only a very small angle at the application of the external shock. The internally-toothed ring gear has no external gear in the outer surface, because the internal gear does not rotate positively.

Thus, there have been two types of planetary gear devices in which the internally-toothed ring gear rotates to any degree. One is a device for controlling the reduction rate by positively rotating the internal gear. The other is a device for alleviating external shock by permitting the internal gear to rotate slightly.

In either case, the internally-toothed ring gear does not rotate freely. Free rotation of the internal gear is forbidden. Here, "free rotation" means an arbitrary rotation angle and an arbitrary rotation velocity.

In the case of a reduction rate adjustable device, the angular velocity of the internally-toothed ring gear is definitely controlled by an additional gear. In the case of a shock absorbing device, the internally-toothed ring gear rotates very little. The rotation angle of the internally-toothed ring gear is far less than 90 degrees. In most cases, it is less than 10 degrees.

Both improved devices permit the internal gear to rotate by any means to give the carrier a torque output. There has never been a planetary gear assembly which gives the carrier a torque output at some times but gives it no torque output at other times.

SUMMARY OF THE INVENTION

The purpose of this invention is to provide such a planetary gear assembly which transmits torque intermittently from a sun gear to a carrier. Namely, the planetary gear device of this invention has two states—transmission state and interception state. The device can be switched over from one state to another at any time.

The transmission state is defined as the state in which a torque output with a certain reduction rate is transmitted to the carrier. The rotation of the sun gear is definitely coupled to the rotation of the carrier. Thus, the proportions of angular velocities and torques between the sun gear and the carrier are absolutely constant. The interception state is defined as the state in which no torque is transmitted from the sun gear to the carrier. The rotation of the sun gear is perfectly separated from the carrier. There is no relation between the sun gear and the carrier regarding angular velocities and torques. The angular velocity or torque of the carrier are not determined by the velocity or torque of the sun gear.

The planetary gear assembly of this invention comprises a sun gear, a plurality of planetary gears enclosing and meshing with the sun gear, an internally-toothed ring gear enclosing and meshing with the planetary gears and a carrier rotatably supporting each planetary gear with a planetary shaft. The internally-toothed ring gear has two outer sliding surfaces on both sides of an outer wall and a timing tooth shaped on a groove in the middle of the outer wall, the outer sliding surfaces being rotatably supported by bearings. A stopper device is provided to prevent the internally-toothed ring gear from rotating by engaging with the timing tooth.

This planetary gear assembly can operate in two distinct states, and it can transit from one state to another state at any arbitrary time. The first state is a transmission state in which rotation torque is transmitted from the sun gear to the carrier. In this state, the stopper device engages with the timing tooth of the internally-toothed ring gear. Thus, the internally-toothed ring gear is at rest. Since the internally-toothed ring gear is fixed ($\Omega i = 0$), reduced output rotation is transmitted to the carrier as in a conventional planetary gear assembly.

Substituting ($\Omega i = 0$) into Eq. (2), we obtain the reduction rate R $$R = \frac{\Omega s}{\Omega c} = 1 + \frac{I}{S} \quad (5)$$

which is the same as Eq. (1). Of course, the ratio of torques is equal to R. Ts and Tc denote the torques of the sun gear and the carrier, respectively. The ratio S of these torques is written as $$S = \frac{Tc}{Ts} = 1 + \frac{I}{S} = R \quad (6)$$

This equation holds true because the internally-toothed ring gear is at rest.

One problem of this state is the concentration of reaction torque to the stopper device. In an ordinary planetary gear assembly, the entire periphery of the internally-toothed ring gear contacts with the entire inner surface of the casing and the reaction torque of the internally-toothed ring gear generated by the sun gear and the carrier is borne by the entire surface of the casing. However, in the case of this invention, the entire reaction torque $\Sigma$ of the internally-toothed ring gear is concentrated on the stopper device. The torque $\Sigma$ acting upon the stopper device is defined as $$\Sigma = -\frac{I}{S+I} Tc \quad (7)$$

$$= \frac{I}{S} Ts \quad (8)$$

where clockwise torque is defined to be positive. The sign of the sun gear torque Ts is inverse to that of the carrier torque Tc with the relation between Ts and Tc given by $$Tc = -\frac{S+I}{S} Ts \quad (9)$$

Eq. (7) teaches that a torque slightly smaller than the carrier torque Tc is locally applied to the stopper device. Thus, the stopper device and the timing tooth must be strong enough to endure the concentrated reaction torque.

The second state for the device of this invention is an interception state in which torque is not transmitted from the sun gear to the carrier. In the interception state, the timing tooth separates from the stopper device and the internally-toothed ring gear can rotate freely without reaction torque. Free rotation of the internal gear is the most conspicuous feature of the interception state. This feature clearly distinguishes the planetary gear assembly of this invention from the two types of prior art mentioned above. They do not allow the internally-toothed ring gear to rotate freely at any time. The reduction rate adjustable device rotates the internal gear positively by an adjusting gear (T). The shock absorbing device prohibits the internally-toothed ring gear from rotating more than about 10 degrees.

In both prior art types, the internally-toothed ring gear rotates with a definite amount of torque which is larger than the torque acting upon the carrier. However, in the planetary gear assembly of this invention, the internally-toothed ring gear rotates freely without torque in the interception state. This fact leads to a new and strange relation among the torques.

Ts, $\Sigma$ and Tc designate the torques which external members apply to the sun gear, internally-toothed ring gear and carrier, respectively. In general, the sum of torques acting on a body which is in a stationary rotation is zero, because angular acceleration of the body is zero. A planetary gear assembly receives torques through a sun gear, a carrier and an internally-toothed ring gear. Thus, the sum of the torques Ts, $\Sigma$ and Tc is zero. Namely $$Ts + \Sigma + Tc = 0 \quad (10)$$

Free rotation of the internally-toothed ring gear means that the torque which an external member applies to the internally-toothed ring gear is zero. This is simply expressed by $$\Sigma = 0 \quad (11)$$

The product of torque by angular velocity is the work done in a unit time. As the sum of works applied to a planetary gear assembly is always zero, we obtain an energetic equation $$T_s\Omega_s + \Sigma\Omega_i + T_c\Omega_c = 0 \tag{12}$$

With the kinetic equation (2), dynamic equation (10), energetic equation (12) and another relation, the ratios of angular velocities and torques can be uniquely determined. In a conventional planetary gear assembly (equivalent to the transmission state of this invention), another relation is expressed by $\Omega_i=0$, because the internally-toothed ring gear is fixed by a casing. Substituting this additional relation into the three equations, we will obtain equations (5), (6) (8) and (9) which hold in a conventional device.

In the interception state of this invention, an additional relation is given by Eq. (11). But Eq. (11) cannot determine the ratio of the dynamic variables—torques and angular velocities. In consideration of Eq. (11), Eq. (2), Eq. (10) and Eq. (12) become $$S\Omega_s + I\Omega_i = (S+I)\Omega_c \tag{13}$$

$$T_s + T_c = 0 \tag{14}$$

$$T_s\Omega_s + T_c\Omega_c = 0 \tag{15}$$

These equations can be easily be simultaneously solved. Regarding torques, the answer is $$T_s = -T_c \tag{16}$$

Then, if $T_s \neq 0$, regarding annular velocities, we obtain $$\Omega_c = \Omega_s = \Omega_i \tag{17}$$

This means that all the members of the planetary gear assembly rotate in a body, because the three moving members with the same axis rotate at the same angular velocity. However, this is an unrealistic limit in which the friction between the sun gear and planetary gears or between the planetary gears and internally-toothed ring gear is very large. Such a whole-rotating state does not happen, because the friction is small in an actual planetary gear device. Eq. (17) is an unrealistic solution.

In practice, if $\Sigma=0$, according to Eq. (11), the torques of Eq. (16) vanish: $T_s=0$, $T_c=0$. Then Eq. (14) and Eq. (15) have no significance. Only the kinetic equation (2) has significance. Thus $$S\Omega_s + I\Omega_i = (S+I)\Omega_c \tag{18}$$

$$T_s = 0 \tag{19}$$

$$T_c = 0 \tag{20}$$

Eq. (18) means that if $\Omega_s$ is determined, $\Omega_i$ and $\Omega_c$ are not determined. Eq. (19) and Eq. (20) mean that no torque is transmitted between the sun gear and the carrier. Namely, in the interception state, the output torque of the carrier is zero. Of course, the input torque of the sun gear is also zero. Therefore, the sun gear, planetary gears and carrier are in free rotation, as well as the internally-toothed ring gear, in the interception state.

BRIEF DESCRIPTION OF THE DRAWINGS

An embodiment of this invention will now be explained with the help of the drawings.

DESCRIPTION OF THE PREFERRED EMBODIMENT

Figure 1:
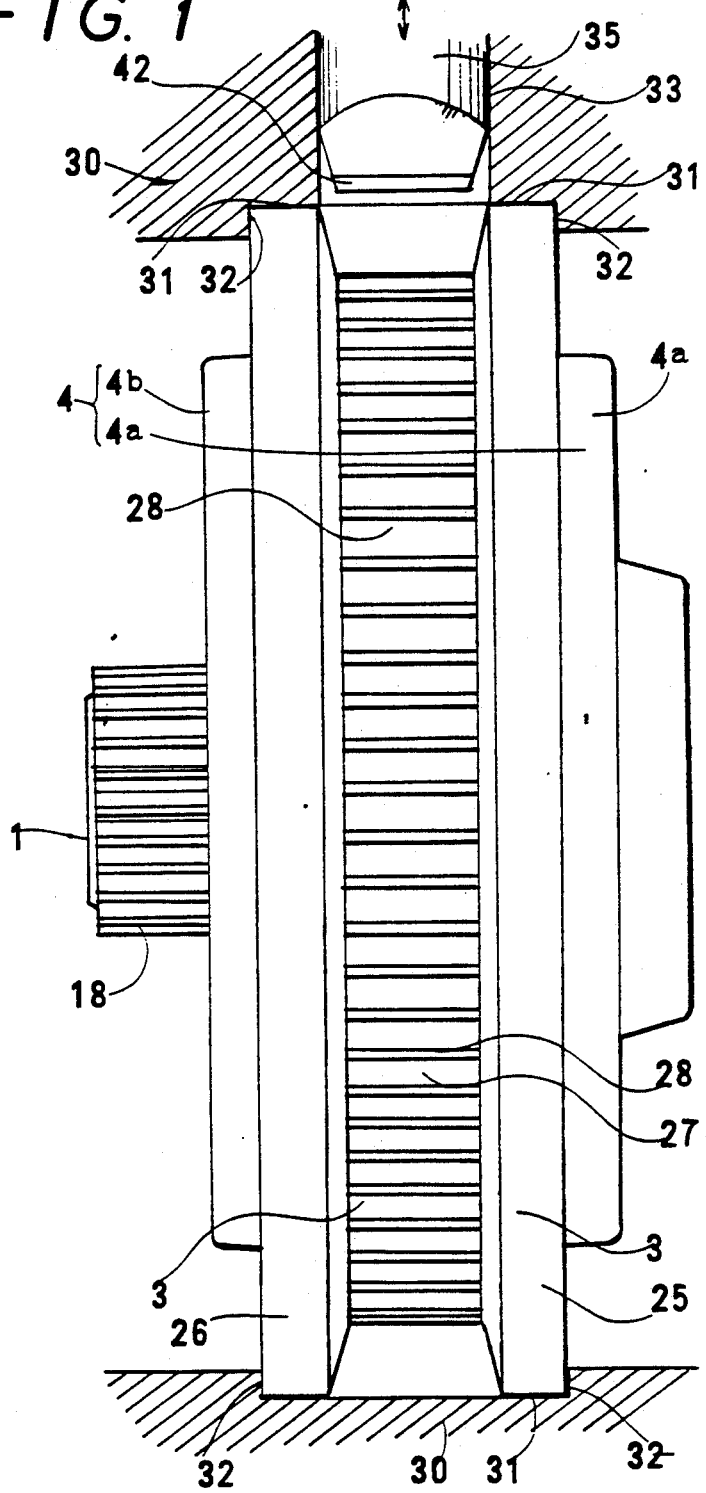
FIG. 1 is a side view of an embodiment of this invention.
Figure 2:
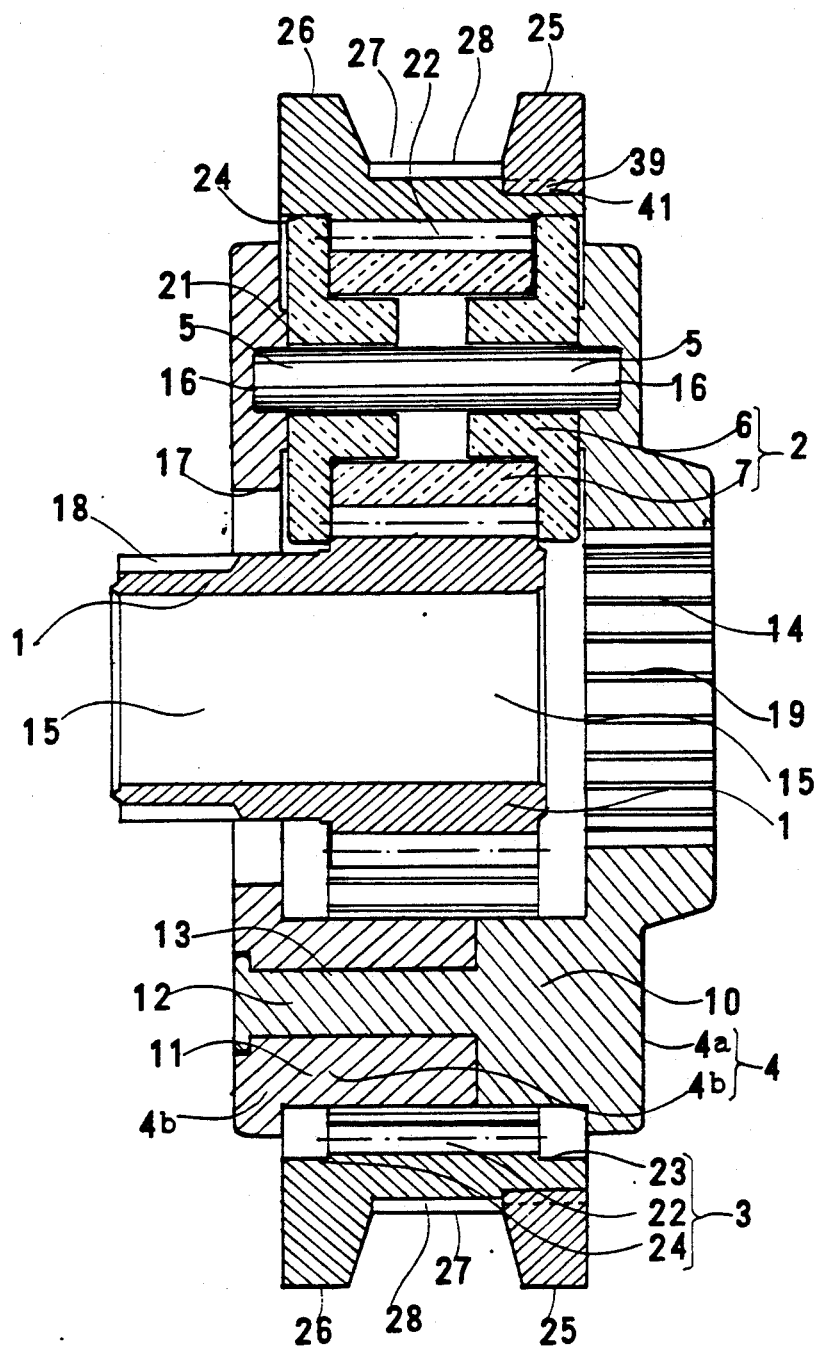
FIG. 2 is a sectional side view.

A sun gear 1 lies at the center of the planetary gear assembly and meshes with three or four planetary gears 2, which enclose it. The planetary gears 2 mesh with an internally-toothed ring gear 3, which encloses the planetary gears 2. The planetary gears 2 are rotatably supported by planetary shafts 5 which are fixed to a carrier 4 at both ends.

The carrier 4 consists of a circular main carrier disc 4a and a circular sub-carrier disc 4b. In this embodiment, the planetary gear 2 consists of two planetary discs 6 on both sides and a middle planetary gear part 7. The middle planetary gear part 7 meshes with the sun gear 1 to transmit torque. The planetary discs 6 have no toothed portions, but smooth outer surfaces. The diameter of the outer surface of each planetary disc 6 is larger than the diameter of the tooth edge circle of the middle planetary gear part 6.

At a boss of each planetary disc 6, a shaft hole 21 is perforated in an axial direction and a planetary shaft 5 is inserted through the shaft hole 21. The middle planetary gear part 7 is a cylindrical gear whose inner surface is smooth. The inner surface of the middle planetary gear part 7 is supported by the bosses of the planetary discs 6. There is a small clearance between the inner surface of the middle planetary gear part 7 and the outer surface of the bosses of the planetary discs 6. The clearance permits a relative rotation of the planetary discs 6 with regard to the planetary gear part 7. Both ends of the planetary shaft 5 are fixed in bores on inner sides of the main carrier disc 4a and sub-carrier disc 4b.

The main carrier disc 4a and sub-carrier disc 4b have bosses 10 and 11, respectively, on their inner surfaces at points centrally positioned between two neighboring planetary axes. A thin columnar protrusion 12 is formed on the boss 10 of the main carrier disc 4a. A socket 13 is axially perforated in the boss 11 of the sub-carrier disc 4b. The sub-carrier disc 4b is coupled with the main carrier disc 4a by inserting the protrusions 12 into the sockets 13 and flattening the ends of the protrusions 12 extending from the sockets 13. In this case, the carrier discs 4a and 4b are made from metal, e.g., aluminum, zinc or sintered iron alloy.

In this embodiment, the sun gear 1 is a cylindrical member having a sun hole 15, through which another shaft (not shown in the figures) is inserted. A central part of the sun gear cylinder axially extends out of an opening 17 of the sub-carrier disc 4b. On the outer surface of the extended part of the sun gear 1, an involute spline 18 is shaped for coupling with an input cylindrical member (not shown in the figures). A carrier hole 14 is axially perforated at the center of the main carrier disc 4a for coupling with an output shaft (not shown in the figures). An adequate device for torque transmission should be shaped on the inner surface of carrier hole 14. In this embodiment, an involute serration 19 is utilized for coupling to the output shaft to transmit torque.

As with the triplet structure of each planetary gear 2, the internally-toothed ring gear 3 also has a triplet structure. Namely, there is an internal gear part 22 in the middle on the inner surface of the internally-toothed ring gear 3. The internal gear part 22 meshes with the middle planetary gear parts 7 for transmitting torque. The internal gear part 22 and middle planetary gear parts 7 have the same width. There are two inner cylindrical surfaces 23 and 24, respectively, on the sides of the internal gear part 22.

The diameter of the inner cylindrical surfaces 23 and 24 is bigger than that of the tooth-root circle of the internal gear part 22. The planetary discs 6 contact with and roll on the inner cylindrical surfaces 23 and 24. Radial forces are transmitted by the contact between the inner cylindrical surfaces 23 and 24 and the planetary discs 6.

The most conspicuous feature of the invention relates to the shape of the outer surface of internally-toothed ring gear. The outer surface of the internally-toothed ring gear also consists of three parts. There are two smooth sliding peripheries 25 and 26 on the sides of the outer surface. There is a circular groove 27 between the side sliding peripheries 25 and 26. A timing tooth section having numerous timing teeth 28 is shaped on the circular groove 27. The timing teeth 28 may be shaped as involute teeth, simple triangle-sectioned teeth or may have another shape and are continuously disposed around the entire circumference of the internally-toothed ring gear 3. The diameter of the tooth edge circle of the timing tooth section is smaller than that of the sliding peripheries 25 and 26.

Figure 3:
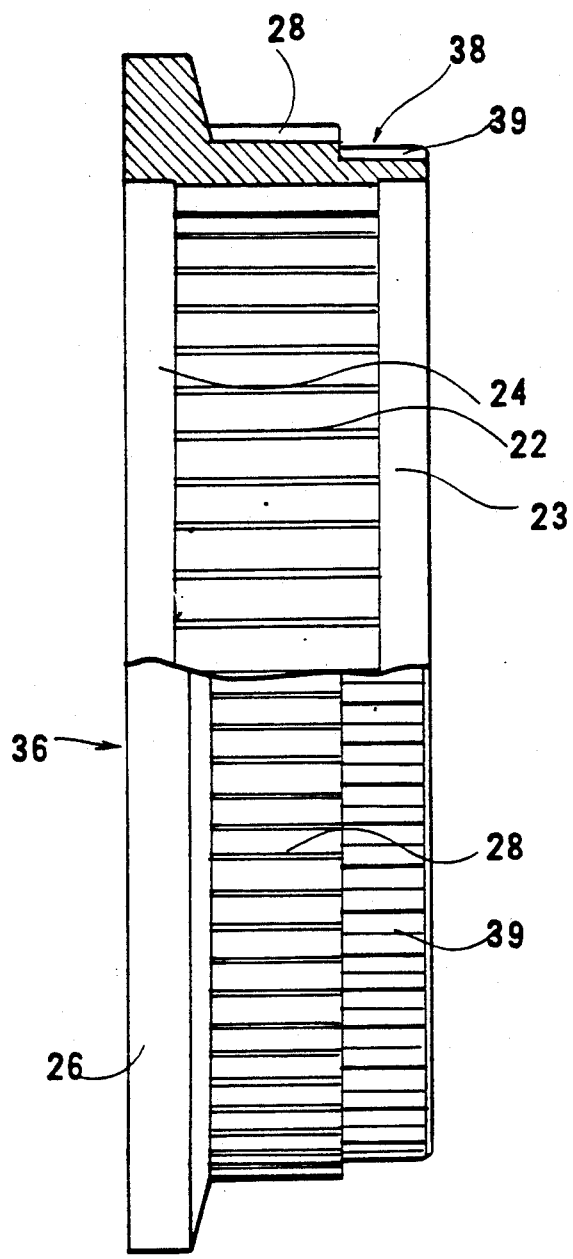
FIG. 3 is a partially sectioned side view of a main part of the internally-toothed ring gear.
Figure 4:
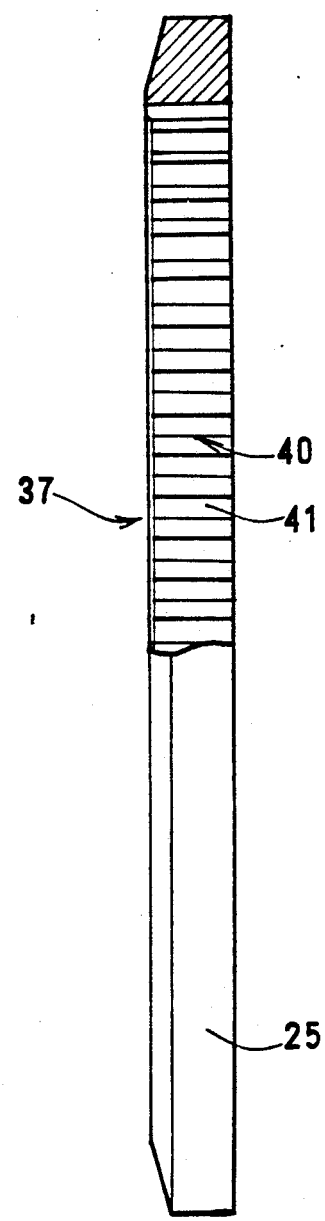
FIG. 4 is a partially sectioned side view of an additional part of the internally-toothed ring gear.

As the internally-toothed ring gear 3 has a middle circular groove 27, it cannot be made in a single body, even if it is made of plastic. Thus, for example, the internally-toothed ring gear 3 is built by coupling the members shown in FIG. 3 and FIG. 4. A main ring 36 can be made of plastic, aluminum, or sintered iron alloy. A sub-ring 37 can be made of a similar material. The main ring 36 is a cylindrical member. The inner gear part 22 and the inner cylindrical surfaces 23 and 24 are formed on the inner surface of the main ring 36. The groove 27 with the timing teeth 28 is made in the middle on the outer surface of the main ring 36. The sliding periphery 26 is shaped on one side of the outer surface. A cylindrical step 38 is formed on the other side of the outer surface. The cylindrical step 38 is smaller in diameter than the tooth-root circle of the timing teeth 28. On the cylindrical step 38 an outer-toothed spline 39 is formed in an axial direction to couple the main ring 36 with the sub-ring 37.

The sub-ring 37 is a ring with a narrower width than the main ring 36. It lacks the members of the inner surface of the internally-toothed ring gear. The outer surface of the sub-ring 37 forms the other sliding periphery 25. On the inner surface 40, the sub-ring 37 has an inner-toothed spline 41 whose teeth are cut in an axial direction on the inner surface 40.

The unified internally-toothed ring gear 3 is built by tightly inserting the outer-toothed spline 39 of the main ring 36 into the inner-toothed spline 41 of the sub-ring 37. The unified internally-toothed ring gear 3 is stable, because there is no clearance between the inner- and outer-toothed splines. Of course, other coupling structures besides spline coupling can be utilized. If the internally-toothed ring gear 3 is made of plastic, a main ring 36 having only a smooth cylindrical step could be coupled with a sub-ring 37 having only a smooth inner surface simply with an adhesive or with ultrasonic welding.

FIG. 1 illustrates the state in which the internally-toothed ring gear 3 is rotatably supported by a bearing device 30. In this example, the bearing device 30 is a cavity which consists of an inner cylindrical wall 31 and two side walls 32. The inner diameter of the inner cylindrical wall 31 is equal to the diameter of the sliding peripheries 25 and 26. The distance between the two side walls 32 is equal to the width of the internally-toothed ring 3. The sliding peripheries 25 and 26 of the internally-toothed ring gear 3 contact and slide on the inner cylindrical wall 31 of the bearing device 30. Side edges of the internally-toothed ring gear 3 contact and slide on the side walls 32 of the bearing device 30. Thus, the internally-toothed ring gear 3 is able to rotate around the central axis as well as the sun gear 1 and the carrier 4.

An inlet hole 33 is perforated in a radial direction at a point in the bearing device 30. A stopper device 35 is slidably mounted in the inlet hole 33. The stopper device 35 can reciprocate in the inlet hole 33. A pertinent apparatus for moving the stopper device 35 is also provided, though the apparatus is not shown in the figures. For example, a solenoid, a cam driven by a motor or a link driven by a motor can be utilized as the moving apparatus. The stopper device 35 has a stopping claw 42 at one end. The stopping claw 42 is a tooth or a few teeth whose section is same as the section of the valley or valleys of the timing teeth 28.

In the transmission state, the moving apparatus moves the stopper device 35 forward such that the stopping claw 42 engages the timing teeth 28. The stopper device 35 is engageable with the internally-toothed ring gear 3 around the entire circumference of the internally-toothed ring gear 3 because of the continuous disposition of the timing teeth 28 around the entire circumference of the internally-toothed ring gear 3. Thus, in the engaged state, the internally-toothed ring gear 3 is fixed. Like usual planetary gear assemblies, the fixed internally-toothed ring gear 3 can stand the reaction torques from the sun gear 1 and the carrier 4 and a reduced output rotation is transmitted to the carrier 4.

In the interception state, the moving apparatus moves the stopper device 35 backward, such that the stopping claw 42 disengages from the timing teeth 28. The separation of the stopping claw 42 allows the internally-toothed ring gear 3 to rotate freely. No torque is transmitted from the sun gear 1 to the carrier 4, because the internally-toothed ring gear 3 cannot stand any torque because of the free rotation.

The interception state and the transmission state can be alternatively selected by the forward or rearward movement of the stopper device 35, because the entire circumference of the middle circular groove 27 has timing teeth 28.

The sun gear 1 can be made of sintered iron alloy, zinc, aluminum or plastic. The planetary discs 6 can be made of plastic, sintered iron alloy, zinc or steel. The planetary gear part 7 can be made of plastic, zinc or sintered iron alloy. The carrier 4 can be made of plastic, sintered iron alloy, aluminum, zinc or steel.

In this embodiment, a sliding bearing is used as the bearing device 30. It can be replaced by a radial bearing also. In this case, the sliding peripheries 25 and 26 shall be replaced by such peripheries having circular grooves on the outer surfaces. The inner cylindrical walls 31 are provided with two circular grooves which correspond to the grooves of the peripheries of the internally-toothed ring gear 3. Several ball bearings are positioned in the gaps between the grooves of the internally-toothed ring gear 3 and the grooves of the bearing device 30.

The advantages of this invention will now be explained. First of all, this invention provides a planetary gear assembly which enables the selection of either the interception state in which the internally-toothed ring gear 3 rotates freely and the torque is not transmitted to the carrier 4, or the transmission state in which the internally-toothed ring gear 3 is fixed and the torque is transmitted to the carrier 4. Namely this device can selectively output torque to the carrier 4 and selectively output no torque to the carrier 4. The role of the planetary gear assembly of this invention may be similar to the sum of a reduction gear device and a coupling device which can transmit or intercept a rotation from an input shaft to an output shaft. However, in the case of the coupling device, either the input shaft or the output shaft must be displaced in an axial direction to couple or decouple the shafts. The planetary gear assembly of this invention can change the states by only moving the stopper device 35 forward or backward in a radial direction instead of displacing the shafts in an axial direction. Thus, the operation for selection between the two states is done quickly and more easily than in the conventional coupling device.

Another advantage is the structural simplicity. This device incorporates both functions of a reduction gear and a coupling device. This device is smaller than a reduction gear coupled with a coupling device with the same capacity for torque transmission.

What I claim is:

1. A timing driving unit which includes a planetary gear assembly, comprises:
    a sun gear,
    a plurality of planetary gears enclosing and meshing with the sun gear,
    an internally-toothed ring gear enclosing and meshing with the planetary gears,
    a carrier rotatably supporting the planetary gears with planetary shafts,
    a bearing device for rotatably supporting the internally-toothed ring gear, and
    a stopper device for stopping the rotation of the internal-toothed ring gear,
    wherein the internally-toothed ring gear includes an outer circumferential middle groove positioned between two outer peripheral circumferential surfaces, the outer peripheral circumferential surfaces engaging with a bearing device to support the internally-toothed ring gear, the middle groove including a plurality of timing teeth continuously disposed around an entire outer circumference thereof, the stopper device movable forward or backward in a radial direction such that when the stopper device is moved forward to engage the timing teeth, the internally-toothed ring gear is stopped and torque is transmitted from the sun gear to the carrier and when the stopper device is moved backward to disengage the timing teeth, the internally-toothed ring gear rotates freely and no torque is transmitted from the sun gear to the carrier, the stopper device closely engageable with the internally-toothed ring gear around the entire circumference of the internally-toothed ring gear because of the continuous disposition of the timing teeth around the entire circumference of the internally-toothed ring gear to quickly and precisely change from the non-torque transmitting state to the torque transmitting state.

2. A timing driving unit as claimed in claim 1, wherein each planetary gear comprises a middle planetary gear part disposed between two planetary discs and the internally-toothed ring gear comprises an internal gear part disposed between two inner cylndrical surfaces, a diameter of the planetary discs being larger than that of tooth-edge circle of the middle planetary gear part and a diameter of the inner cylindrical surfaces being larger than that of a tooth-root circle of the internal gear part.

3. A timing driving unit as claimed in claim 1, wherein the bearing device is a sliding bearing.

4. A timing driving unit as claimed in claim 1, wherein the bearing device is a radial bearing.

5. A timing driving unit as claimed in claim 1, wherein the sun gear is made of sintered iron alloy, zinc, aluminum or plastic.

6. A timing driving unit as claimed in claim 1, wherein the carrier is made of plastic, sintered iron alloy, aluminum, zinc or steel.

7. A timing driving unit as claimed in claim 1, wherein the timing teeth are shaped in an involute spline.

8. A timing driving unit as claimed in claim 1, wherein the internally-toothed ring gear is made of plastic.

9. A timing driving unit as claimed in claim 1, wherein the internally-toothed ring gear comprises:
    a main ring including the middle groove and one outer peripheral circumferential surface; and
    a sub-ring including the outer peripheral circumferential surface, the sub-ring being engaged with the main ring.

10. A timing driving unit as claimed in claim 1, wherein when the stopper device is disengaged from the timing teeth such that the internally-toothed ring gear rotates freely, the angular velocity $\Omega i$ of the internally-toothed ring gear satisfies the equation, $$\Omega i = \frac{(S + I)\Omega c - S\Omega s}{I}$$

where $S$ and $I$ are tooth numbers of the sun gear and the internally-toothed ring gear, and $\Omega c$ and $\Omega s$ and angular velocities of the carrier and the sun gear.

11. A timing driving unit as claimed in claim 2, wherein the middle planetary gear part is rotatable relative to at least one of the planetary discs.

* * * * *